US012527495B2

(12) United States Patent
Fanelli et al.

(10) Patent No.: US 12,527,495 B2
(45) Date of Patent: Jan. 20, 2026

(54) ELECTROOCULOGRAM MEASUREMENT AND EYE-TRACKING

(71) Applicant: Dolby Laboratories Licensing Corporation, San Francisco, CA (US)

(72) Inventors: Andrea Fanelli, Oakland, CA (US); Evan David Gitterman, Palo Alto, CA (US); Nathan Carl Swedlow, Oakland, CA (US); Alex Brandmeyer, Berkeley, CA (US); McGregor Steele Joyner, Alameda, CA (US); Poppy Anne Carrie Crum, Oakland, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 748 days.

(21) Appl. No.: 17/792,886

(22) PCT Filed: Jan. 22, 2021

(86) PCT No.: PCT/US2021/014732
§ 371 (c)(1),
(2) Date: Jul. 14, 2022

(87) PCT Pub. No.: WO2021/150971
PCT Pub. Date: Jul. 29, 2021

(65) Prior Publication Data
US 2023/0071021 A1    Mar. 9, 2023

Related U.S. Application Data

(60) Provisional application No. 63/139,022, filed on Jan. 19, 2021, provisional application No. 62/964,178, filed on Jan. 22, 2020.

(30) Foreign Application Priority Data

Jan. 22, 2020   (EP) ..................................... 20153054

(51) Int. Cl.
*A61B 5/11*   (2006.01)
*A61B 5/256*   (2021.01)
(Continued)

(52) U.S. Cl.
CPC ............ *A61B 5/1114* (2013.01); *A61B 5/256* (2021.01); *G06F 3/013* (2013.01); *G06F 3/015* (2013.01); *G06V 40/18* (2022.01); *G06V 40/70* (2022.01)

(58) Field of Classification Search
CPC ...... A61B 5/1114; G06V 40/18; G06V 40/70; G06F 3/013; G06F 3/015
(Continued)

(56) References Cited

U.S. PATENT DOCUMENTS 5,701,894 A   12/1997  Cherry
8,434,868 B2   5/2013  Sato
(Continued)

FOREIGN PATENT DOCUMENTS

GB    2559984 A    8/2018
JP    2011125692 A    6/2011
(Continued)

OTHER PUBLICATIONS

Favre-Felix, A. et al "Real-time Estimation of Eye Gaze by In-Ear Electrodes" 2017 39th Annual International Conference of the IEEE Engineering in Medicine and Biology Society (EMBC), Seogwipo, 2017, pp. 4086-4089, date of publication: Jul. 2017.
(Continued)

*Primary Examiner* — William J Deane, Jr.

(57) ABSTRACT

A system for determining a direction of gaze of a user, comprising a set of electrodes arranged on earpieces, each electrode comprising a patch of compressible and electrically conducting foam material. The system further includes circuitry connected to the electrodes and configured to
(Continued)

receive a set of voltage signals from a set of electrodes arranged on an audio endpoint worn by a user, multiplex said voltage signals into an input signal, remove a predicted central voltage from said input signal, to provide a detrended signal, and determine said gaze direction based on said detrended signal. Such conducting foam materials provide satisfactory bio-sensing performance for a wide range of compression levels and over time. In the case of on-ear headphones, the foam electrodes may be integrated in the cuffs with little or no effect on the comfort level.

21 Claims, 6 Drawing Sheets

(51) Int. Cl.
    *G06F 3/01*            (2006.01)
    *G06V 40/18*         (2022.01)
    *G06V 40/70*         (2022.01)

(58) Field of Classification Search
    USPC .................................................. 381/71, 71.11
    See application file for complete search history.

(56) References Cited

U.S. PATENT DOCUMENTS

| | | | |
|---|---|---|---|
| 8,449,116 B2 | 5/2013 | Sato | |
| 8,888,287 B2* | 11/2014 | Yahav | G02B 27/01 |
| | | | 351/209 |
| 9,004,687 B2 | 4/2015 | Stack | |
| 9,256,285 B2* | 2/2016 | Leroy | A61B 5/726 |
| 9,579,060 B1 | 2/2017 | Lisy | |
| 9,864,211 B2* | 1/2018 | Belbey | G02C 11/10 |
| 9,907,482 B2 | 3/2018 | Knight | |
| 10,025,379 B2* | 7/2018 | Drake | A61B 3/14 |
| 10,133,544 B2 | 11/2018 | Helwani | |
| 10,466,781 B2* | 11/2019 | Komaki | A61B 5/398 |
| 2009/0097689 A1 | 4/2009 | Prest | |
| 2010/0185115 A1* | 7/2010 | Causevic | A61B 5/38 |
| | | | 600/544 |
| 2011/0170067 A1* | 7/2011 | Sato | A61B 5/7445 |
| | | | 345/157 |
| 2014/0198936 A1 | 7/2014 | Higgins | |
| 2015/0126845 A1 | 5/2015 | Jin | |
| 2015/0190607 A1 | 7/2015 | Sugio | |
| 2015/0297109 A1* | 10/2015 | Garten | A61B 5/38 |
| | | | 600/28 |
| 2016/0093207 A1* | 3/2016 | Di Censo | G08G 1/005 |
| | | | 340/944 |
| 2016/0142830 A1 | 5/2016 | Hu | |
| 2016/0157777 A1 | 6/2016 | Attal | |
| 2017/0259167 A1 | 9/2017 | Cook | |
| 2017/0311097 A1 | 10/2017 | Nielsen | |
| 2017/0339484 A1* | 11/2017 | Kim | A61B 5/165 |
| 2018/0103917 A1 | 4/2018 | Kim | |
| 2018/0333558 A1 | 11/2018 | Levendowski | |
| 2018/0348863 A1* | 12/2018 | Aimone | G06F 3/011 |
| 2018/0368722 A1 | 12/2018 | Lunner | |
| 2019/0053756 A1 | 2/2019 | Ayers | |
| 2019/0117062 A1 | 4/2019 | Yeo | |
| 2019/0298262 A1 | 10/2019 | Noble | |
| 2019/0327570 A1 | 10/2019 | Pontoppidan | |
| 2022/0028406 A1* | 1/2022 | Burmistrov | G06F 18/21 |
| 2023/0065296 A1* | 3/2023 | Khaleghimeybodi | |
| | | | A61B 5/7225 |

FOREIGN PATENT DOCUMENTS

| | | |
|---|---|---|
| JP | 61040352 A | 11/2014 |
| JP | 2018504719 A | 2/2018 |
| JP | 2019139743 A | 8/2019 |
| WO | 2016070188 W | 5/2016 |
| WO | 2018027141 W | 2/2018 |

OTHER PUBLICATIONS

Rahman et al, "Artificial Somatosensors: Feedback Receptors for Electronic Skins" Advanced Intelligent Systems, Sep. 1, 2020, pp. 1-10.

* cited by examiner

ELECTROOCULOGRAM MEASUREMENT AND EYE-TRACKING

CROSS-REFERENCE TO RELATED APPLICATIONS

This application claims the benefit of priority from U.S. Provisional Patent Application No. 63/139,022, filed on Jan. 19, 2021, U.S. Provisional Patent Application No. 62/964,178, filed on Jan. 22, 2020, and EP Patent Application No. 20153054.0, filed on Jan. 22, 2020, all of which are hereby incorporated by reference in their entirety.

FIELD OF THE INVENTION

The present invention relates to eye-tracking using electro-oculography (EOG). In particular, the invention relates to such eye-tracking using sensors mounted on earpieces and/or regions of the temples around the ears.

BACKGROUND OF THE INVENTION

In many situations, eye tracking may be used to understand where user's attention is focused. In particular, eye tracking may enable improved user control of peripherals.

The most common approach for eye tracking is to acquire video images of the user's eyes. The gaze direction of the user may be determined using appropriate image processing and algorithms based on numerical analysis or deep learning. The downside of such video-based eye tracking is the necessity to have a camera pointed at the user's face, or mounted on the head, which significantly limits the possible applications.

Recently, an alternative to video-based eye tracking has been introduced, involving electro-oculography (EOG). Electro-oculography (EOG) is the measurement of the electrical dipole potential of the corneo-retinal dipole of the eyeball (difference in electrical charge between the cornea and the retina). When the eyes move in the orbit, the dipole rotates. This electrical potential can be measured using a set of electrodes placed near the orbit and can be used to estimate the eye position. The accuracy of the EOG is estimated to be about 0.5 degrees.

The standard approach for EOG measurement consists in placing silver-chloride electrodes around the eye orbit bi-temporally. EOG is mostly used in medical applications, because of the inconvenience associated to the use of sticky silver-chloride electrodes around the eyes.

However, proposals have also been made to use EOG based eye tracking in other applications. For example, document WO 2018/0368722 discloses EOG-based eye tracking which may be used e.g. in hearing aid applications.

GENERAL DISCLOSURE OF THE INVENTION

It is an object of the present invention to provide an improved approach to EOG.

According to a first aspect of the present invention, these and other objects are achieved by a system for determining a direction of gaze of a user, comprising an audio end-point including a pair of earpieces, each earpiece intended to be worn adjacent to a respective one of the user's ears, and a set of electrodes arranged on each earpiece, such that they, in use, are placed in contact with the user's skin, each electrode comprising a patch of compressible and electrically conducting foam material, configured to provide a reliable electrical connection with the skin (bio-electrodes). The system further includes circuitry connected to the electrodes and configured to receive a set of voltage signals from a set of electrodes arranged on an audio endpoint worn by a user, multiplex said voltage signals into an input signal, remove a predicted central voltage from said input signal, to provide a detrended signal, and determine said gaze direction based on said detrended signal. Such compressible and electrically conducting foam materials are typically used for electrical insulation of electronics.

A second aspect of the invention relates to a method corresponding to the first aspect.

Such conducting foam materials, e.g. based on low-density microcellular urethan foam, have several advantages, including high conductivity, soft touch to the skin, satisfactory bio-sensing performance in a dry state (i.e. without the need of e.g. conductive paste), and maintained performance for a wide range of compression levels and over time. In the case of on-ear headphones, the foam electrodes may be integrated in the cuffs with little or no effect on the comfort level.

According to some embodiments of the invention, two estimates of the central voltage for the next iteration (k+1) are determined using the central voltage of the current iteration (k), and the predicted central voltage for previous iterations k−1, k−2, . . . , k−N. By using two methods for central voltage estimation accuracy is improved (boosting).

Eye-tracking according to the invention may be used for several applications, including presentation control, headphone control, attention decoding, active dialog enhancement, foveal rendering, improved AR/VR experiences, improved content consumption on TVs and mobile devices, drone control, and camera control in cinematography.

The invention is compatible with a broad variety of endpoint devices, including but not limited to: headphones, head mounted displays, hearing aids, smart glasses, hearables, and ear plugs.

Further, it is noted that the term "earpiece" should be interpreted broadly, and is intended to cover any part of the audio end-point located on the side of the head. For example, in some embodiments of the invention, earpieces include earbuds, in-ear monitors, headphones, assistive listening devices, earphones, or portions of other devices (e.g., eyewear, AR/VR goggles, etc.).

According to third aspect of the invention, these and other objects are achieved by a system for determining a direction of gaze of a user, comprising a set of electrodes arranged to be in contact with the user's skin, each electrode comprising a patch of compressible and electrically conducting material, configured to provide a reliable electrical connection with the skin, and circuitry connected to the electrodes and configured to receive a set of voltage signals from a set of electrodes arranged on an audio endpoint worn by a user, multiplex the voltage signals into an input signal, calculating a current central voltage as a difference between the input signal and a voltage representing a current gaze direction, provide a first estimate as a linear weighting of a current central voltage and a current estimated baseline voltage, provide a second estimate as a mean of the current central voltage and a prediction based on a set of preceding predicted central voltages, determine a predicted central voltage as an average of the first and second estimates, remove the predicted central voltage from the input signal, to provide a detrended signal, and determine the gaze direction based on the detrended signal.

According to this aspect, the electrodes are not arranged on an end point device worn by a user. Instead, the electrodes are attached directly to a user's skin, and may be formed by so called "electronic skin". The processing of signals may be similar or identical to that disclosed in relation to the first aspect of the invention.

Yet another aspect of the invention relates to a method corresponding to the third aspect.

BRIEF DESCRIPTION OF THE DRAWINGS

The present invention will be described in more detail with reference to the appended drawings, showing currently preferred embodiments of the invention.

DETAILED DESCRIPTION OF EMBODIMENTS OF THE INVENTION

Figure 1:
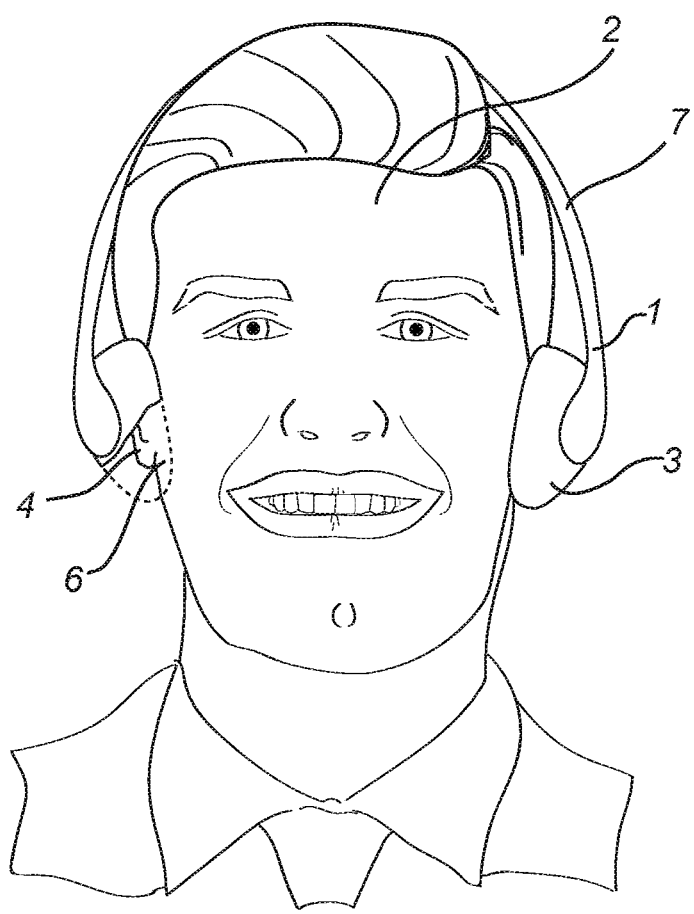
FIG. 1 shows a user wearing a set of headphones according to an embodiment of the present invention.
Figure 2:
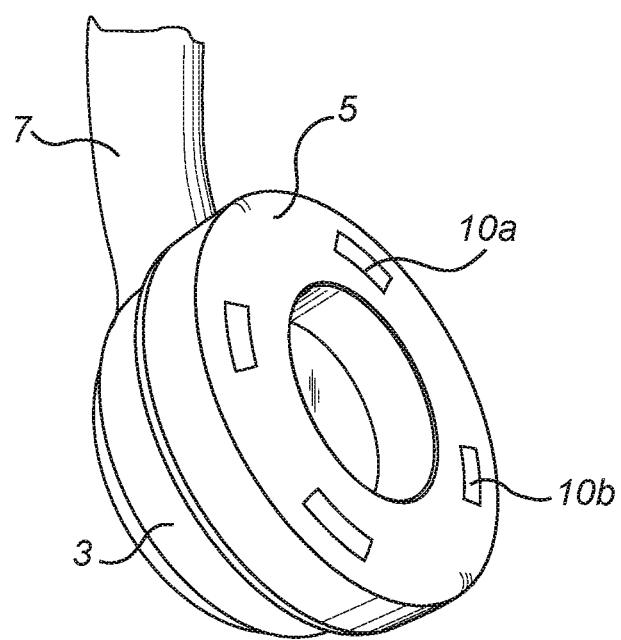
FIG. 2 shows a cuff of the headphones in FIG. 2.

As an example, FIGS. 1 and 2 show how electrodes may be placed on a set of on-ear headphones 1 worn on the head 2 of a user. By "on-ear" is meant that the headphones 1 includes two cuffs (left/right) 3 which cover the user's ears 4. The rim 5 of each cuff 3 rests against an area 6 of the user's head 2 surrounding the ear 4. The cuffs 3 serves to (to a large extent) shut out ambient sound, to enable an audio playback with as little disturbance as possible. The on-ear headphones are designed with a headband 7 that sustain the weight of the headphones 1 on the head 2. The headband creates a horizontal pressure 8 pushing the cuffs 3 against the area 6.

A set of electrodes 10 is arranged on the endpoint, so as to be in contact with the user's head during use. The set of electrodes 10 includes a plurality of lead electrodes 10a and at least one bias electrode 10b. The electrodes 10 can be active or passive.

In the illustrated example, where the endpoint is embodied by a set of on-ear headphones 1, the electrodes 10 include patches provided on the rim 5 of each cuff 3, as shown in FIG. 2. In use, the horizontal pressure 8 will push the patches 10 against the skin, thus reducing the contact impedance, and improving the bio-sensing capabilities. The rims 5 have a large contact with the area 6, thus providing a large available space on which electrodes may be provided. The patches 10 may have any appropriate shape, for example square, rectangular, circular or ellipsoidal. In the case of other endpoints, such as in-ear headphones, a different placement and design of the electrodes 10 may be adequate.

The patches 10 may be fabricated using conductive foams with high electrical conductivity. Preferably, the material is able to retain thickness under temperature and provide a consistent and reliable electrical connection. The electrode material may have low vertical resistance, e.g. less than 0.005Ω), with the ability to preserve optimal conductivity performance during compression.

For example, the material used for the electrodes may have a thickness of 0.33 to 0.53 mm, with a vertical contact resistance of 0.001 to 0.003Ω. The volume resistivity may be a typical volume resistivity of 1.3 to 2.94 Ω·cm. The material may have a surface resistivity of 0.1 to 0.12 Ω/sq. The resistance goes from 0.09Ω to 0.001Ω when a stress of 0.12 N/mm$^2$ is applied, so a very small change in resistivity is associated to a compression in the material. The electrodes can be fabricated with an adhesive side that allow for easy integration with plastic or metal casing.

As an example, the electrodes may be made of a Condux Plus™ foam from Rogers Corporation.

It is noted that other materials than foam may also be used for the electrode patches. For example, textile patches or other conductive materials could be used for the electrodes.

Also even thinner sensor materials, in the order of nm, could be contemplated. Such thin and also stretchable electrodes, which may be attached directly to the skin of a user, are sometimes referred to as "electronic skin". Electronic skin may be made by combining oxide materials with biocompatible silicon, and may include a self-modifying coating, e.g. made from vanadium dioxide. Further details are provided in the article *Artificial Somatosensors: Feedback Receptors for Electronic Skins*, by Rahman et al, Sep. 1, 2020.

Figure 3:
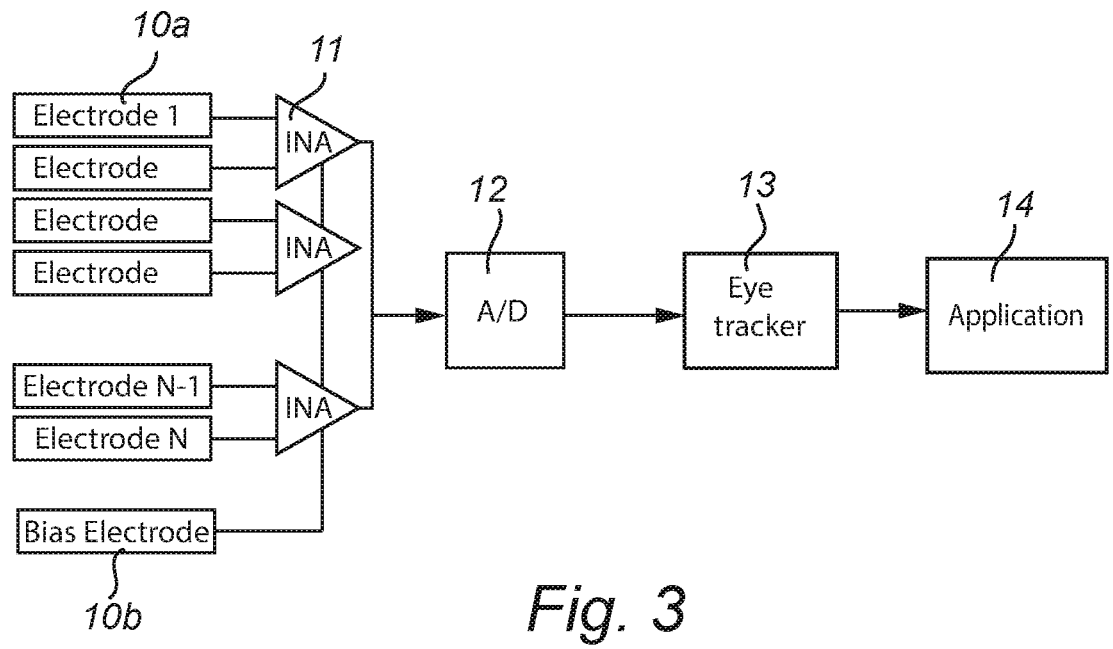
FIG. 3 is an overview of eye tracking according to an embodiment of the present invention.

Turning now to the estimation of eye gaze, and with reference to FIG. 3, the signals from the lead electrodes 10a are conditioned in the analog domain using instrumentational amplifiers 11, and the signal from the bias electrode 10b is used in this process to reduce common mode noise. The conditioned signals are multiplexed, A/D converted by an A/D converter 12 and supplied to an eye tracking processing circuitry 13, which identifies changes in gaze direction and determines an instantaneous gaze direction (e.g., relative gaze angle or direction). Finally, the output from the processing circuitry 13 is used independently to control some appliance, application or peripheral 14. Examples of applications where eye-tracking according to the invention may be useful include presentation control, headphone control, active dialog enhancement, foveal rendering, improved AR/VR experiences, improved content consumption on TVs and mobile devices, drone control, and camera control in cinematography.

Figure 6A:
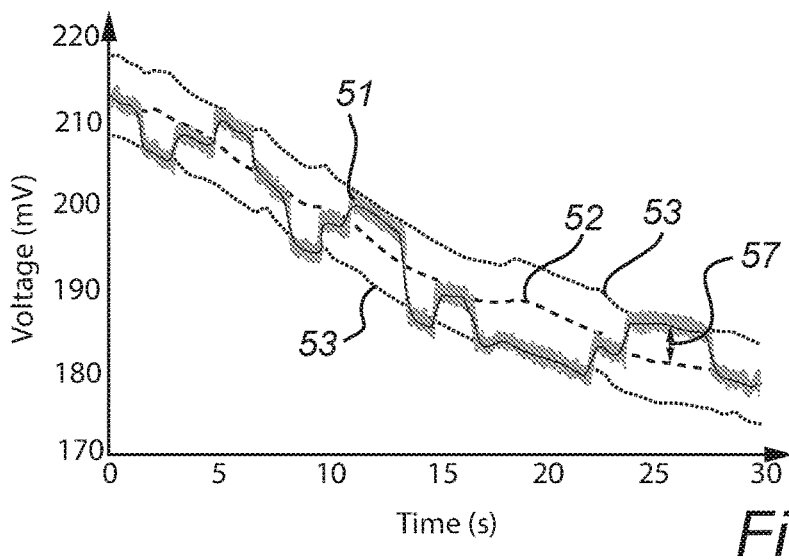
FIG. 6a is a diagram showing the measured signal.

FIG. 6a shows an example of a signal input to the circuitry 13 from the A/D converter 12. The grey colored areas 51 represent the actual signal, which is noisy and fluctuates around an average. The dashed line 52 is a voltage representing a forward (central) gaze direction (referred to as "central voltage"). The two dotted lines 53 are the left voltage limit and the right voltage limit. These voltages represent an extreme left or right gaze, and are separated from the central voltage 52 by a fixed delta voltage which is constant for each individual.

With continued reference to FIG. 6a, the amplitude (voltage) of the measured signal 51 is correlated to the user's gaze direction. A difference 57 between the currently measured voltage 51 and the central voltage 52 is referred to as gaze ΔV, and represents the current gaze angle (e.g., a gaze direction; a gaze direction relative to reference direction or angle). The gaze of a person shifts between focus points, referred to as saccades. A transition between saccades is typically characterized by a relatively rapid or jumpy movement of the eyes from one focus point to another.

The central voltage 52 is subject to a non-negligible drift (downwards slope in FIG. 6a). For a specific saccade, i.e. a constant gaze ΔV 57, the measured voltage will therefore also drift. The difference between the measured signal and the (drifting) central voltage is always a voltage 57 representing the current gaze direction.

By predicting the drift of the central voltage 52, the gaze estimator 13 is able to detect transitions to another gaze direction, e.g. a new saccade. In the following, a predicted value of the central voltage for iteration k is referred to as a baseline (k).

The eye tracking processing circuitry 13 is shown in more detail in FIG. 4, and will be discussed in the following. The processing shown in FIG. 4 will be able to handle gaze direction in one plane, e.g. horizontal (left-right) and vertical (up-down). Therefore, in reality there will need to be two parallel processes, one for each plane. For simplicity, only one (left-right) is discussed here.

Another eye movement is vergence which relates to the depth being gazed. In this case, the eyes move in opposing directions, either inward or outward. Vergence is relevant for applications involving distance changes from less than 1 meter to more than 3 meters. Interactivity with a mobile phone and other objects will often involve vergence changes. Watching a normal TV does not involve vergence changes, but watching an autostereoscopic TV, with a depth display, may involve vergence changes.

In the presently disclosed embodiment, the algorithm works on data windows (segments) including a set of samples. The window length is a variable parameter, and does not affect the principles of the algorithm. As an example, the sampling rate can be 250 Hz, and the window length may be 1/10 second, i.e. 25 samples.

Each window (index k) of the signal is first processed in block 21 to remove power line noise. In the present example, this is achieved using a moving average filter. Alternatively, digital IIR or FIR filters could be used for the same purpose. The output of block 21 is the filtered signal (index k).

Next, the baseline (k), e.g. the estimated central voltage of the current window, is removed in block 22. Estimation of the central voltage will be described below, with reference to blocks 31-36. It is noted that baseline (k) is a single value representing a prediction of the baseline over the entire next window (i.e. here 25 data points).

For baseline removal, the value of baseline (k) is subtracted from each sample in the filtered signal(k) according to:

detrended signal($k$)=filtered signal($k$)−estimated baseline($k$)

After baseline removal, the detrended signal is used in a gaze estimator 23 to estimate an angle of horizontal gaze. In the current implementation this is obtained using a linear regression model that is calibrated using maximum left gaze and maximum right voltages as upper and lower bounds. The maximum left and right voltages correspond to the voltages of maximum possible left and right gaze angles, and depend on the central voltage as will be described below with reference to blocks 30a and 30b. Other alternatives regarding how to estimate gaze from a detrended signal, without using a linear regression model, are also possible.

The detrended signal is also used in state classifier 24 to make a state classification, e.g. to establish whether the horizontal gaze direction is in a left, right or center state. This is obtained using a linear state classifier. In this implementation, a linear discriminant analysis was used. Alternatively, other multi-class classifiers can be used (such as logistic regression or support vector machines). The same task could also be achieved using neural networks. Although in the present example only includes three states, more states can be added to the classification (for example, intermediate states such as center-left, or center-right, and numerous states befitting the resolution capable with the implementations SNR, i.e. consistent with the number of positions possible with the aforementioned 0.5 degree accuracy).

As mentioned above, the outputs from block 23 and block 24 may both be used independently to drive the application 14.

The detrended signal is further provided to a transition classifier 25, to identify a transition, i.e. a change in gaze, caused e.g. by a change from one saccade to another, or by a "smooth pursuit" eye movement. Every time a new saccade occurs, the detrended signal will show a vertical voltage shift (up or down). Put differently, when the user moves his eyes, the difference between measured voltage and central voltage (straight gaze) will change. The transition classifier 25 processes each data window (index k) to determine if it includes such a voltage shift. A shift in voltage representing a transition to a new saccade will typically be rapid, and can be identified in the detrended signal as a step or a ramp over a short time period. The transition classifier 25 may also identify shifts caused by "smooth pursuit" eye movements.

If the current window does not contain an identifiable transition (which means the user did not move the eyes), then gaze ΔV will be unchanged, according to:

gaze Δ$V(k)$=gaze Δ$V(k-1)$

Further, gaze ΔV(k) is used by a central voltage calculator 27 to calculate a current central voltage (k), according to:

central Voltage($k$)=median[filtered signal($k$)−gaze Δ$V(k)$]

where the single value gaze ΔV(k) is subtracted from each sample in filtered signal(k). Note that central voltage (k) is not a prediction in the same way as baseline (k), but is based on the knowledge of the measured signal (and determined gaze) during window (k).

If a transition is detected by transition classifier 25, a time stamp (which sample) of the transition is supplied to block 28, where a new gaze ΔV is determined. Block 28 also receives the filtered signal (k) (i.e. before detrending) and the baseline (k). The new gaze ΔV can then be determined based on the voltage level of the filtered signal after the time stamp, according to:

gaze Δ$V(k)$=median[filtered signal($k$)$_{post\ transition}$−baseline($k$)]

The new gaze ΔV value is stored and used for the following iterations, until another transition is detected. Further, central voltage estimator 29 estimates a current central voltage as central Voltage($k$)=baseline($k$).

The value for central voltage (k) is used by right and left voltage estimators 30a, 30b, to determine new potential maximum voltages for the measured voltage. It is noted that such max/min voltages are not necessary for gaze estimation. However, in some implementations they may be used to improve accuracy in the gaze estimator 23 and state classifier 24. By setting these thresholds to appropriate values, so called "smooth pursuit" eye movements can also be tracked.

It is noted that the estimation of gaze direction (block 23) and classification of state (block 24) herein are described as being performed for every iteration. Consequently, also left and right max voltages are determined (blocks 30a, 30b) every iteration. This may be advantageous for increasing reliability, but will reduce computational efficiency. If the transition detection in block 25 is reliable, it may therefore be advantageous to estimate gaze and classify state only when a transition is detected in block 25. In that case, blocks 23 and 24 would be located immediately after block 28.

Prediction of central voltage for the next iteration, referred to as baseline, will now be described with reference to blocks 31-36.

A first estimated baseline A is generated using a leaky integrator 31, forming a linear weighting of the previous central voltage and the previous estimated baseline:

$$\text{baseline}_A(k+1) = \alpha \cdot \text{centralVoltage}(k) + (1-\alpha) \cdot \text{baseline}(k)$$

The leaky integrator 31 could be replaced by a band-pass filter with adjustable low and high frequency cut-offs for smooth pursuit tracking.

A second estimated baseline B is generated using a register 32 and an AR model 33. The register 32 stores a set of N+1 preceding predictions baseline(k), baseline(k−1), baseline(k−N), and this set is supplied to the AR model 33. The AR model 33 generates a prediction $\text{basefine}_{ARmodel}(k+1)$, which is then averaged with the central voltage(k) in block 35 to provide the second estimate B as:

$$\text{baseline}_B(k+1) = \frac{\text{baseline}_{AR\,model}(k+1) + \text{central Voltage}(k)}{2}$$

The two estimated baselines A and B are the averaged in block 36 to obtain the final baseline(k+1), which will be stored in register 32 and used in the following iteration in block 22 to detrend the filtered signal.

Figure 4:
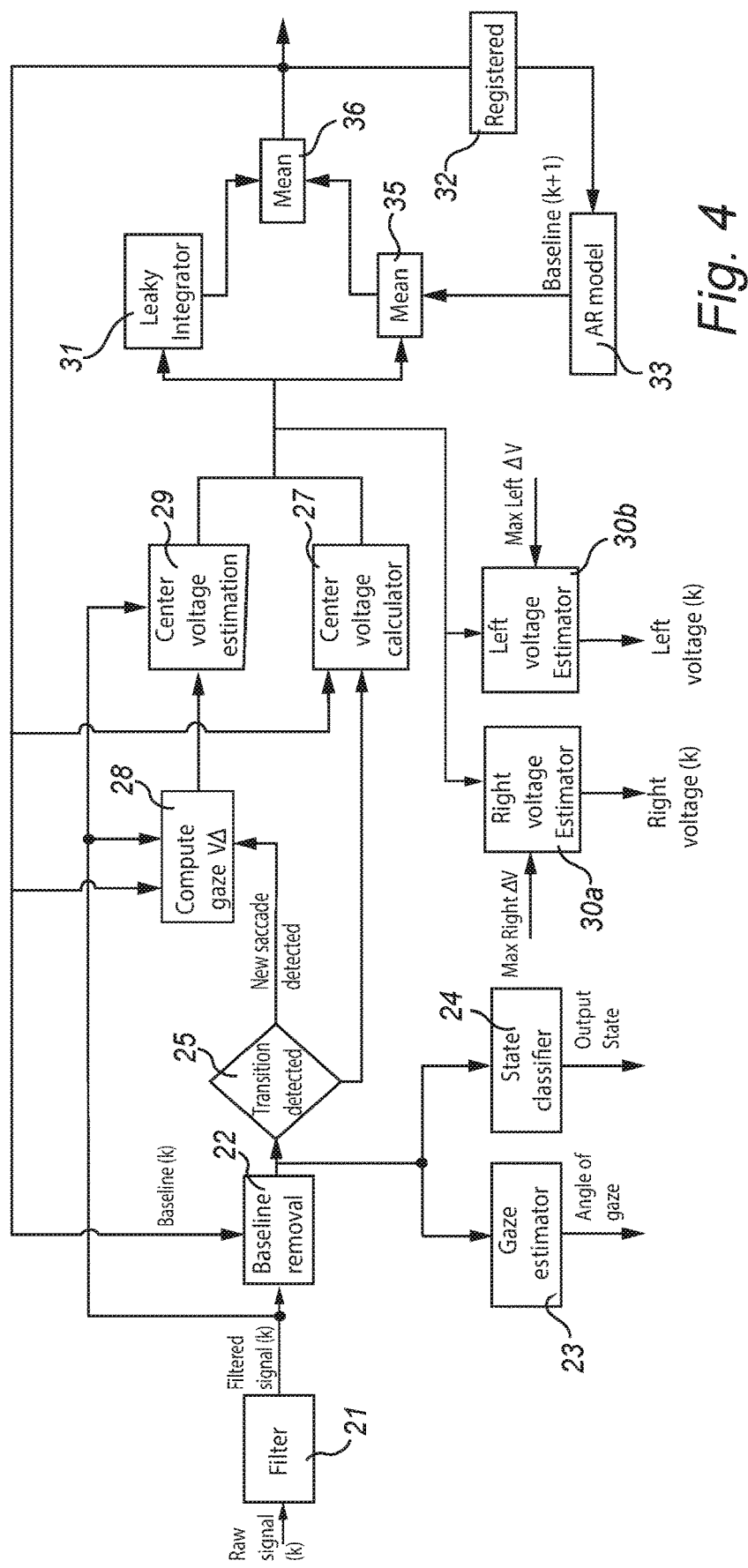
FIG. 4 shows the eye tracking block in FIG. 3 in more detail.

The process in FIG. 4 requires a brief training session to work correctly. During the training session, a user is asked to perform a few eye 'gestures' (move eyes from right to center, center to left, left to center, center to right). Additional gestures can be added to improve accuracy or to increase the number of states that we want to identify (as described before, being able to also classify states such as center-left or center-right). In applications explicitly linked to a display, for further accuracy, the user can be asked to fixate targets on the display of known position.

Figure 5:
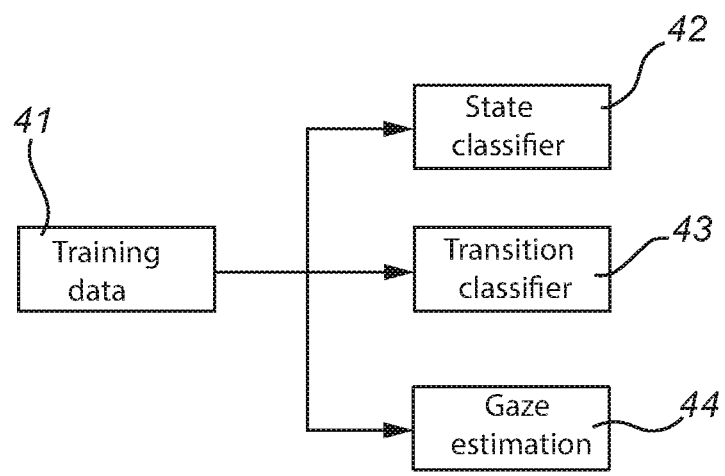
FIG. 5 shows an overview of a training process according to an embodiment of the present invention.

The training procedure is used to train the models used in blocks 23, 24 and 25 (estimation model, classification model and transition model). In one embodiment, shown in FIG. 5, a linear regression model is used for classification and gaze estimation. The training process needs to be performed once and is specific for each individual, and training data 41 may be collected using a training process with a simple set of eye gestures. The collected data 41 is used to train a first model 42 used in the state classifier (block 24) to classify the gaze direction among the possible states (center-right-left-up-down). Further, the collected data 41 is used to train a second model 43 used in the transition detector 25, to identify a transition from one saccade to another. Finally, the collected data 41 is used to train a third model 44 used in the gaze estimator 23 to estimate horizontal and vertical gaze.

It is noted that the system disclosed herein in principle (at the expense of less accuracy) may work without training, but by simply choosing approximated parameter values.

Figure 6B:
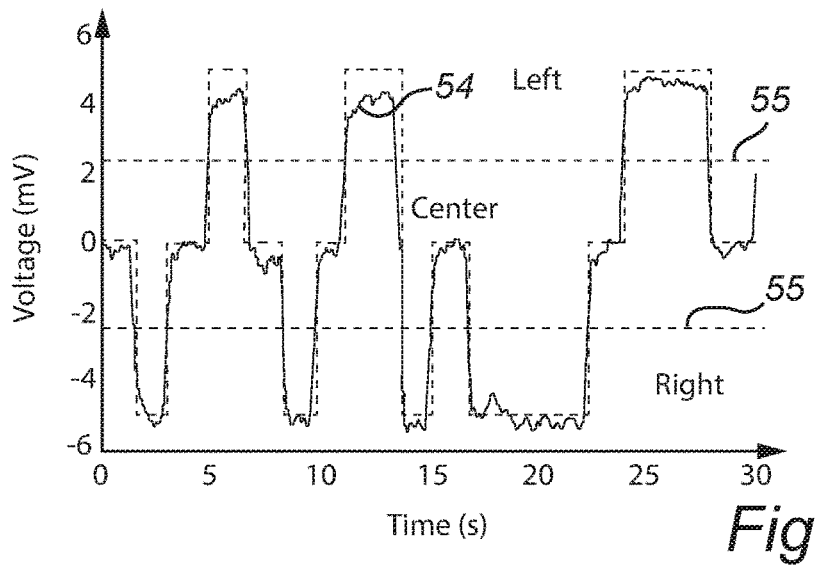
FIG. 6b is a diagram showing the signal after baseline removal.

FIG. 6b shows the signal 54 (e.g., signal input 51 after signal processing and baseline removal in blocks 21 and 22, which is the signal input to the two branches in FIG. 4). It is clear that the baseline drift visible in FIG. 6a has now been removed. The classification boundaries (e.g. related to the max/min voltages) are indicated as dashed lines 55.

Figure 6C:
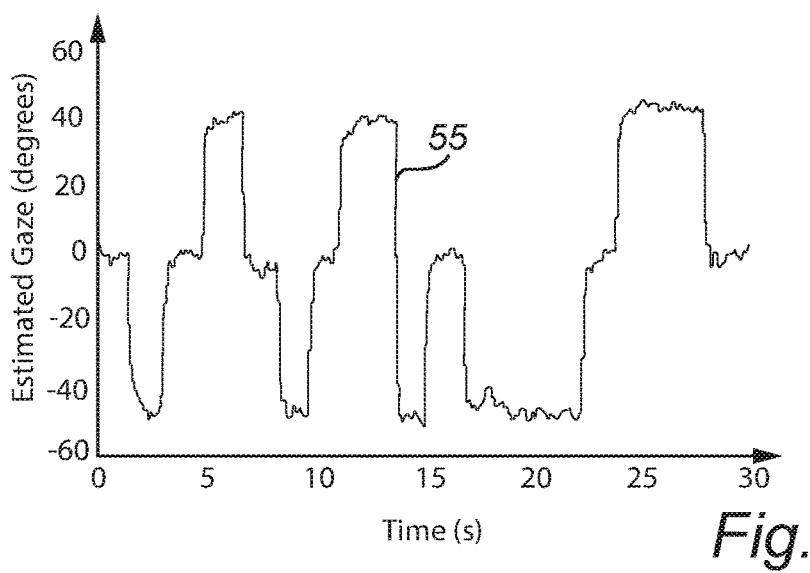
FIG. 6c is a diagram showing the estimated gaze angle.

FIG. 6c shows an estimated angular value 56 of gaze, resulting from the signal 54 in FIG. 6b.

Figure 7:
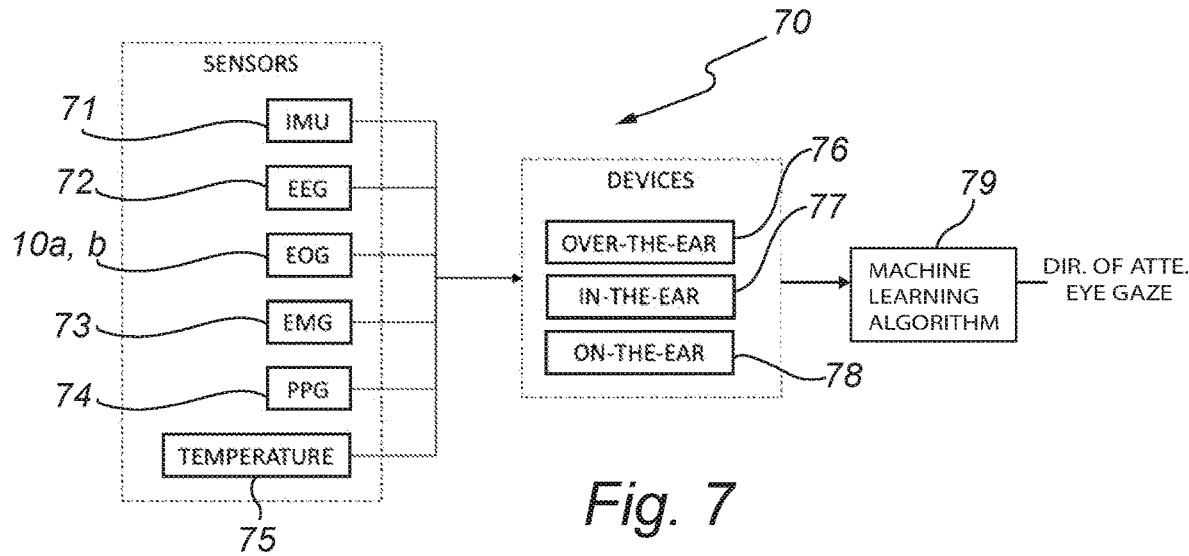
FIG. 7 is a block diagram of a system for determination of direction of attention, according to a further embodiment if the invention.

The EOG approach for eye gaze detection as described above may advantageously be combined with additional sensors or measurement units, in particular additional sensors for measuring physiological response. As illustrated in FIG. 7, a system 70 may include, in addition to EOG electrodes 10a, 10b, at least one of the following additional sensor systems:

an inertial measurement unit (IMU) 71 for measuring acceleration, magnetic field and angular rate
electrodes 72 for measuring electroencephalogram (EEG)
electrodes 73 for measuring electromyogram (EMG)
sensors 74 for measuring heart rate and blood pressure (photoplethysmogram, PPM)
temperature sensor 75

A large variety of sensors could be contemplated, including display-based sensors, visible wavelength camera sensors, simultaneous localization and mapping sensors, thermal imagers, head-mounted-display sensors, in-ear sensors, wrist sensors, gaze position sensors, pupil diameter sensors, facial expression sensors, head position sensors, viewing distance sensors, facial expression sensors, valence sensors, arousal sensors, electroencephalogram sensors, specifically positioned electrodes, thermal sensors, optical sensors, electro-oculogram sensors, respiration sensors, plethysmography-heartrate-based sensors, galvanic skin response sensors, gas sensors, CO2 content sensors, R3COH content sensors, or seat-based sensors.

The data collected from all these sensors and systems is provided to one or several devices for appropriate pre-processing. For example, the processing discussed above with reference to FIG. 4 may be undertaken with respect to the EOG signals. The devices may be included in over-the-ear headphones 76, on-ear headphones 77, or in-ear headphones 78, as appropriate.

An appropriately trained neural network 79 is connected to receive the preprocessed signals, and to estimate a direction of attention and/or eye gaze.

A system according to the present invention may have a number of different applications.

Figure 8:
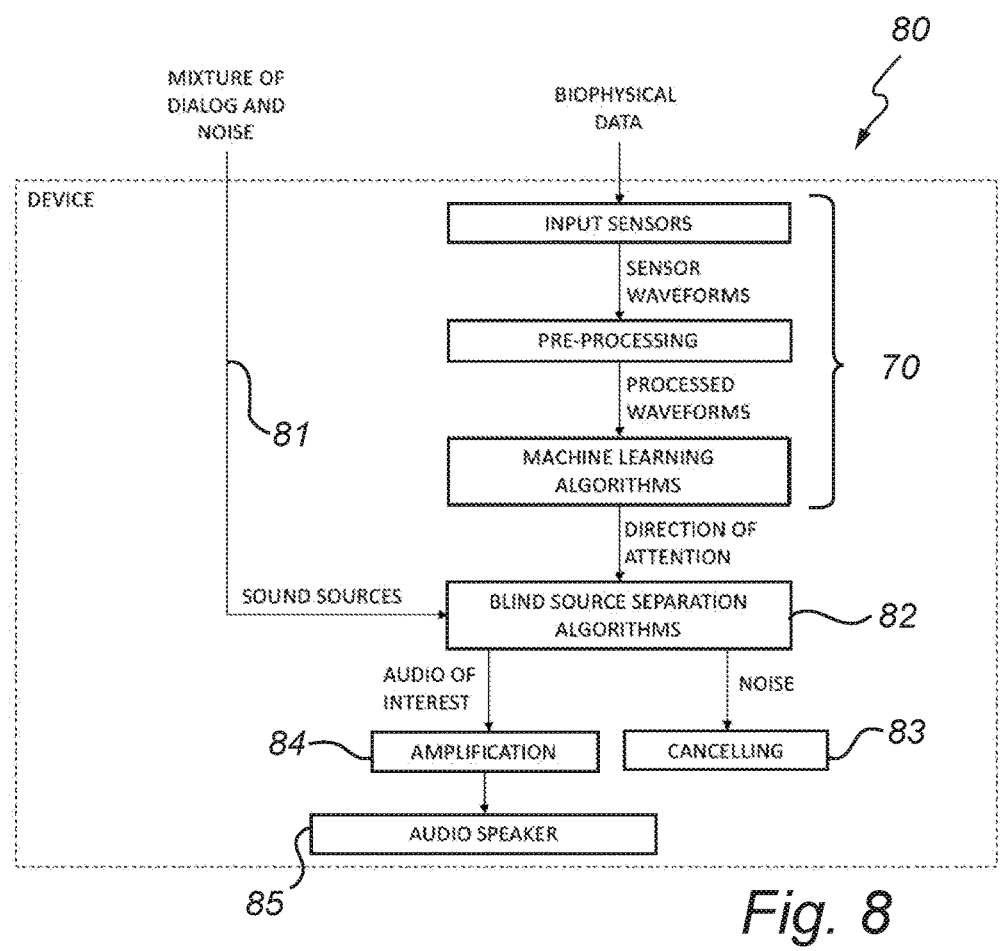
FIG. 8 is a block diagram of a system for improving auditory attention, according to a further embodiment if the invention.

FIG. 8 shows a block diagram of a system 80 configured to improve the brain's ability to focus one's auditory attention (an effect of selective attention in the brain) on a particular stimulus while filtering out a range of other stimuli. Such focus allows a person to focus on a single conversation in a noisy room, e.g. at a party, and the phenomenon is sometimes referred to as the "cocktail party effect". In some situations the natural brain's ability to single out a specific dialog stream is not sufficient to follow the conversation without cognitive load. The system in FIG. 8 may augment dialog in those situation.

A sensor system, e.g. a system 70 as shown in FIG. 7, receives biophysical data and provides a direction of attention of the user. In parallel, a mixture 81 of dialogue and noise is collected by an array of microphones, preferably including beamforming microphones. The collected audio mix 81 and direction of attention is received by a blind source separation processor 82, which is configured to extract the relevant dialogue among the audio mix 81 measured by the microphone array. Noise may be attenuated or cancelled by an attenuator 83. The relevant dialogue is subsequently amplified by an amplifier 84 and output to the user by appropriate speakers 85.

Figure 9:
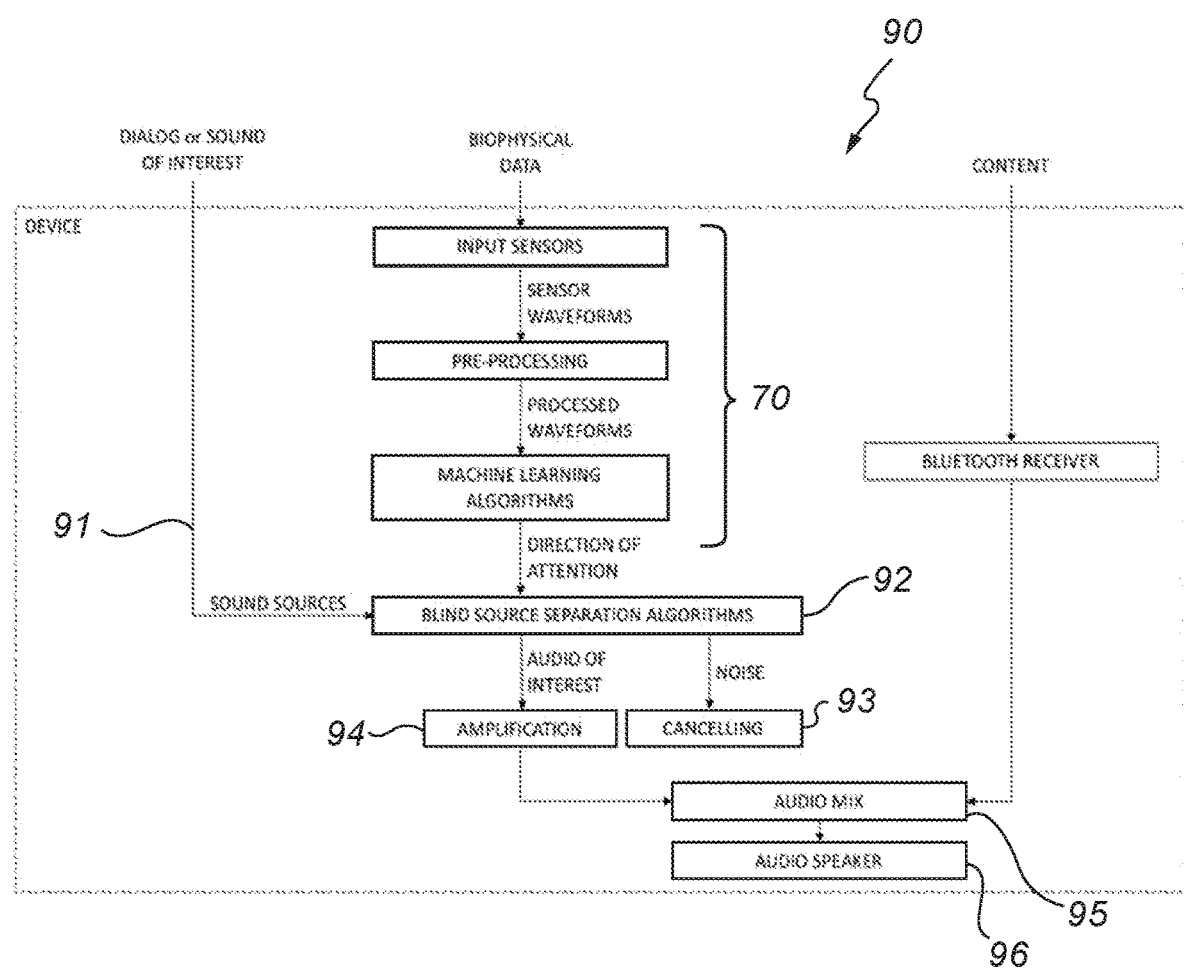
FIG. 9 is a block diagram of a system for controlling a pass-through feature of noise-cancelling headphones, according to a further embodiment if the invention.

FIG. 9 shows a block diagram of a system 90 configured to control a pass-through feature of noise-cancelling headphones. Modern noise-cancelling headphones typically have the capability to allow audio pass-through when the user takes part in a dialogue or when dialogue is received from the surroundings. The system in FIG. 8 introduces the possibility to control the directionality of audio pass-through using biophysical sensors.

A sensor system, e.g. a system 70 as shown in FIG. 7, receives biophysical data and provides a direction of attention of the user. In parallel, dialogue or sound of interest 91 is collected by an array of microphones, preferably including beamforming microphones. In a blind source separation processor 92, similar to the algorithm referred to in the description of FIG. 8, the direction of attention is used to separate the collected audio mix into noise and relevant audio, e.g. audio coming from the direction of user attention, or dialog or sound the user is attending. Noise may be cancelled by an attenuator 93. The relevant audio is amplified by an amplifier 94 provided to a mixer 95, where it is mixed into the content currently received by the headphones and intended for playback. The mix is consequently played back by the headphone speakers 96.

Final Remarks

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described specific embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention. For example, in the illustrated embodiments, the endpoint device is illustrated as a pair of on-ear headphones. However, the invention is also applicable for other end-point devices, such as in-ear headphones and hearing aids.

The invention claimed is:

1. A system for determining a gaze direction of a user, comprising:
  an audio end-point including a pair of earpieces, each earpiece intended to be worn adjacent to a respective one of the user's ears;

a set of earpiece electrodes arranged on each earpiece, such that the earpiece electrodes, in use, are placed in contact with the user's skin;

each earpiece electrode comprising a patch of compressible and electrically conductive foam material, configured to provide an electrical connection with the skin; and circuitry connected to the earpiece electrodes and configured to:
receive a set of voltage signals from the set of earpiece electrodes;
multiplex the voltage signals into an input signal;
remove a predicted central voltage, representing a forward gaze direction, from the input signal, to provide a detrended signal;
determine the gaze direction based on the detrended signal; and
determine a subsequent predicted central voltage by:
calculating a current central voltage as a difference between the input signal and a voltage representing a current gaze direction;
providing a first estimate as a linear weighting of the current central voltage and a current estimated central voltage;
providing a second estimate as a mean of the current central voltage and a prediction based on a set of preceding predicted central voltages; and
determining the subsequent predicted central voltage as an average of the first and second estimates.

2. The system in claim 1, wherein the audio end-point is a pair of on-ear headphones, each on-ear headphone including a cuff configured to rest against the skin of a user's head, and wherein the earpiece electrodes are arranged on a rim of the cuff intended to rest against the skin.

3. The system of claim 1, wherein the conductive foam material has a thickness of less than one mm, and a vertical contact resistance of less than 0.005 Ω.

4. The system of claim 1, wherein the conductive foam material has a volume resistivity is in a range 1.3 to 3 Ω·cm.

5. The system of claim 1, wherein the conductive foam material has a surface resistivity of 0.1 to 0.12 Ω/sq.

6. The system of claim 1, wherein the prediction is made using an AR model and the set of predicted central voltages.

7. The system of claim 1, further comprising identifying a shift in the detrended signal representing a transition of the user's gaze from one saccade to another saccade.

8. The system of claim 1, further comprising determining a state of the gaze direction, the state being selected from a group including a left state and a right state, wherein the left and right states are defined by the detrended signal exceeding or falling below a defined threshold value.

9. A method for determining a gaze direction of a user, comprising:
at an audio end-point including a pair of earpieces, each earpiece supporting a set of earpiece electrodes comprising a patch of compressible and electrically conducting material configured to provide an electrical connection with the user's skin, the audio end-point arranged on the user such that the earpiece electrodes are in contact with the user's skin in a vicinity of each respective ear, acquiring a set of voltage signals from the set of earpiece electrodes;
multiplexing the voltage signals into an input signal;
removing a predicted central voltage, representing a forward gaze direction, from the input signal, to provide a detrended signal; and
determining the gaze direction based on the detrended signal;
wherein the predicted central voltage is determined by:
calculating a current central voltage as a difference between the input signal and a voltage representing a current gaze direction;
providing a first estimate as a linear weighting of the current central voltage and a current estimated central voltage;
providing a second estimate as a mean of the current central voltage and a prediction based on a set of preceding predicted central voltages; and
determining the predicted central voltage as an average of the first and second estimates.

10. The method of claim 9, wherein the prediction is made using an AR model and the set of predicted central voltages.

11. The method of claim 9, further comprising identifying a step change in the detrended signal, the step change representing a transition of the user's gaze from one saccade to another saccade.

12. The method of claim 9, further comprising determining a state of the gaze direction, the state being selected from a group including a left state and a right state, wherein the left and right states are defined by the detrended signal exceeding or falling below a defined threshold value.

13. The method of claim 9, wherein the audio end-point is a pair of on-ear headphones, each on-ear headphone including a cuff configured to rest against the skin of a user's head, and wherein the earpiece electrodes are arranged on a rim of the cuff intended to rest against the skin.

14. The system of claim 1, further comprising:
at least one additional sensor; and
a neural network for estimating a direction of attention given input from the system and from the at least one additional sensor.

15. The system according to claim 14, wherein the at least one additional sensor includes at least one sensor for measuring a physiological response.

16. The system according to claim 14, wherein the additional sensor includes at least one of: an inertial measuring unit (IMU), a sensor for measuring heart rate, a sensor for measuring blood pressure, a temperature sensor, electrodes for electroencephalogram, EEG, and electromyogram, EMG.

17. The system according to claim 14, further comprising a system for improving auditory attention, comprising:
a blind source separation processor connected to receive the direction of attention and an audio mix including dialogue and noise, the blind source separation processor configured to extract dialogue received from the direction of attention; and
an amplifier for amplifying the extracted dialogue.

18. The system according to claim 14, further comprising a system for controlling a pass-through feature of noise-cancelling headphones, comprising:
a blind source separation processor connected to receive the direction of attention and an audio mix including dialogue and noise, the blind source separation processor configured to extract dialogue received from the direction of attention;
an amplifier for amplifying the extracted dialogue; and
a mixer for mixing the extracted dialogue into content intended for playback on the noise-cancelling headphones.

19. A method for determining a gaze direction of a user, comprising:
- receiving a set of voltage signals from a set of electrodes arranged on an audio endpoint worn by a user, the set of electrodes in contact with the user's skin, each electrode comprising a patch of compressible and electrically conducting material configured to provide an electrical connection with the user's skin;
- multiplexing the voltage signals into an input signal;
- calculating a current central voltage as a difference between the input signal and a voltage representing a current gaze direction;
- providing a first estimate as a linear weighting of a current central voltage and a current estimated baseline voltage;
- providing a second estimate as a mean of the current central voltage and a prediction based on a set of preceding predicted central voltages;
- determining a predicted central voltage as an average of the first and second estimates;
- removing the predicted central voltage from the input signal, to provide a detrended signal; and
- determining the gaze direction based on the detrended signal.

20. A system for determining a gaze direction of a user, comprising:
- a set of electrodes arranged to be in contact with the user's skin, each electrode comprising a patch of compressible and electrically conducting material configured to provide an electrical connection with the skin; and
- circuitry connected to the electrodes and configured to:
  - receive a set of voltage signals from the set of electrodes;
  - multiplex the voltage signals into an input signal;
  - calculating a current central voltage as a difference between the input signal and a voltage representing a current gaze direction;
  - provide a first estimate as a linear weighting of a current central voltage and a current estimated baseline voltage;
  - provide a second estimate as a mean of the current central voltage and a prediction based on a set of preceding predicted central voltages;
  - determine a predicted central voltage as an average of the first and second estimates;
  - remove the predicted central voltage from the input signal, to provide a detrended signal; and
  - determine the gaze direction based on the detrended signal.

21. A non-transitory computer readable medium storing instructions which when executed by one or more processors of an electronic device, cause the electronic device to perform the method of claim 10 or claim 19.

* * * * *